United States Patent [19]

Wahl et al.

[11] Patent Number: 4,765,805

[45] Date of Patent: Aug. 23, 1988

[54] METHOD AND APPARATUS FOR REMOVING DUST AND GAS POLLUTANTS FROM WASTE GASES, PARTICULARLY WASTE GASES PRODUCED IN THE MANUFACTURE OF OPTICAL WAVEGUIDE PREFORMS

[75] Inventors: Rudolf Wahl, Stuttgart; Erwin Walz, Renningen, both of Fed. Rep. of Germany

[73] Assignee: Standard Elektrik Lorenz A.G., Fed. Rep. of Germany

[21] Appl. No.: 8,201

[22] Filed: Jan. 29, 1987

[30] Foreign Application Priority Data

Feb. 5, 1986 [DE] Fed. Rep. of Germany ....... 3603511

[51] Int. Cl.$^4$ ............................................. B01D 46/02
[52] U.S. Cl. .......................................... 55/18; 55/19; 55/71; 55/72; 55/89; 55/96; 55/227; 55/228; 55/270; 55/341.1
[58] Field of Search .................... 55/18, 19, 71, 72, 89, 55/96, 227–229, 270, 341 R, 361, 381

[56] References Cited

U.S. PATENT DOCUMENTS

| | | | |
|---|---|---|---|
| 3,582,262 | 6/1971 | Tomany | 55/71 X |
| 3,762,133 | 10/1973 | Merriman et al. | 55/71 X |
| 3,920,419 | 11/1975 | Schroeder et al. | 55/18 X |
| 3,933,978 | 1/1976 | Margraf | 55/71 X |
| 3,950,152 | 4/1976 | Guon | 55/96 |
| 4,042,667 | 8/1977 | Ishiwata et al. | 55/71 X |
| 4,578,090 | 3/1986 | Rado | 55/71 X |
| 4,614,645 | 9/1986 | Yoneda et al. | 55/71 X |

FOREIGN PATENT DOCUMENTS

| | | |
|---|---|---|
| 2634491 | 3/1977 | Fed. Rep. of Germany .......... 55/18 |
| 2849498 | 5/1980 | Fed. Rep. of Germany . |
| 3429956 | 4/1985 | Fed. Rep. of Germany . |
| 3514857 | 10/1985 | Fed. Rep. of Germany . |
| 32190 | 3/1979 | Japan ..................................... 55/71 |
| 2146261 | 4/1985 | United Kingdom . |

OTHER PUBLICATIONS

H. Schneider & G. Zeidler, "Herstellverfahren und Ausfuhrungsformen von Lichtwellenleitern", Telcom Report 6 (1983), Beiheft, pp. 29–35.

Primary Examiner—Robert Spitzer
Attorney, Agent, or Firm—Peter C. Van Der Sluys

[57] ABSTRACT

A method is disclosed for purifying waste gases containing extremely finely dispersed pollutants in dust form and pollutants in gas and vapor form, particularly for purifying waste gases produced in chemical vapor phase reactions during the manufacture of optical waveguide preforms. In a first step, dust is extracted in a dry, coated fabric filter (1). The gaseous and vaporous pollutants are then absorbed in a gas scrubber. During this gas-scrubbing process, as soon as the absorption liquid circulating in an absorption-liquid circulation system reaches a pretermined pollutant concentration, part of the absorption liquid is withdrawn from the absorption-liquid circulation system and detoxicated in a separate detoxication circulation system. The part withdrawn is simultaneously replaced by fresh, unpolluted absorption liquid. The method requires little maintenance, is fully automatic and, since the necessary chemicals are added in measured quantities, keeps chemical consumption to a minimum while fully satisfying the legal requirements for prevention of air and water pollution.

9 Claims, 1 Drawing Sheet

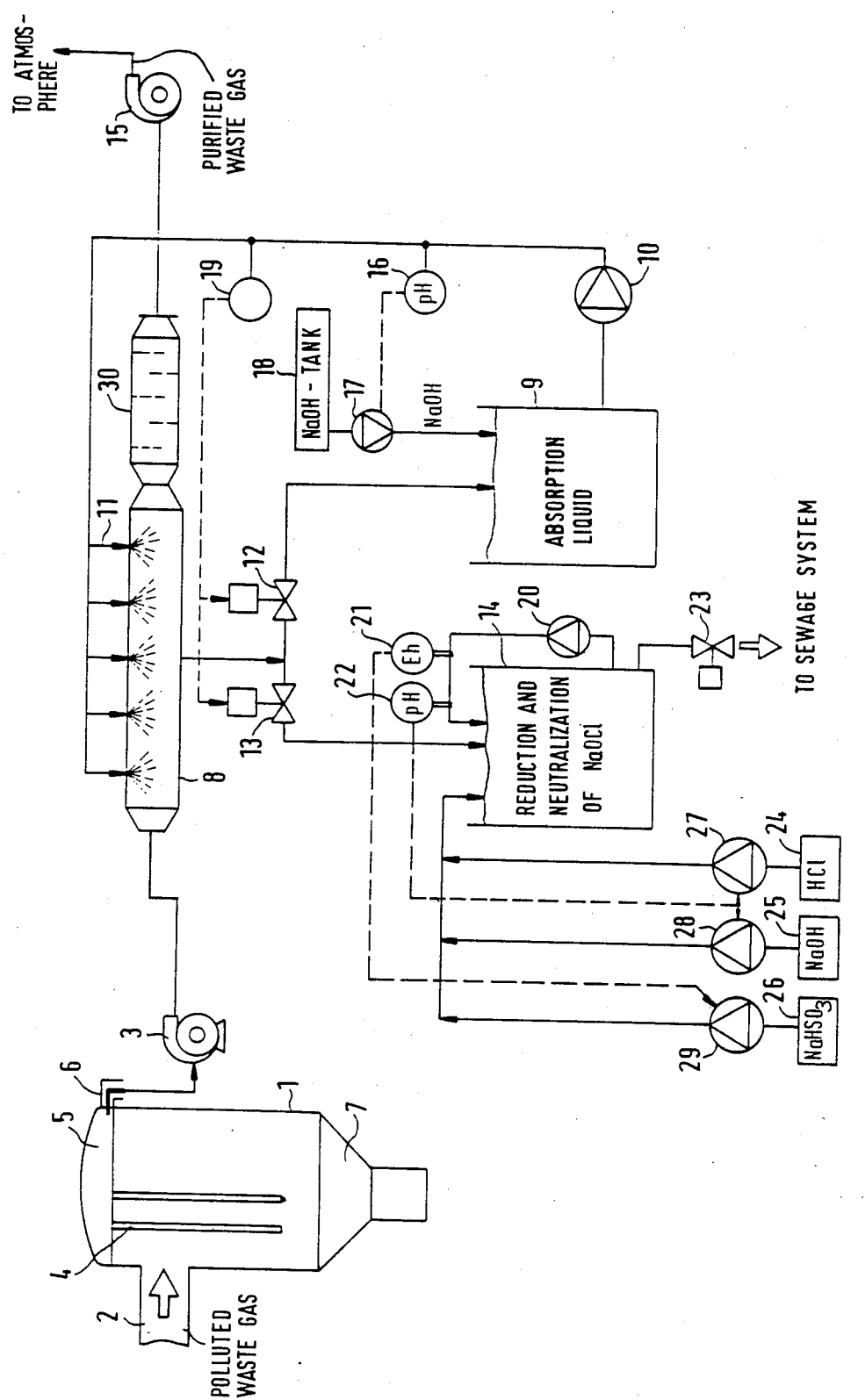

METHOD AND APPARATUS FOR REMOVING DUST AND GAS POLLUTANTS FROM WASTE GASES, PARTICULARLY WASTE GASES PRODUCED IN THE MANUFACTURE OF OPTICAL WAVEGUIDE PREFORMS

The invention relates to a method for purifying waste gases containing pollutants in dust, gas, and/or vapor form wherein in a first step, dust is extracted, and wherein in one or more further steps, the gaseous pollutants are absorbed from the dust-free waste gas by means of an absorption liquid flowing in an absorption-liquid circulation system and an appropriate apparatus for carrying out the method. Such a method is disclosed in DE-OS No. 34 29 956.

In that method, waste gases containing dust and gas pollutants are purified by extracting dust in a first step and by subsequently absorbing the gas pollutants in following scrubber steps. The method serves to purify waste gases produced by coal-fired boilers.

If that method is used to purify other waste gases whose dust pollutants have an extremely fine distribution, such as the dusts of $SiO_2$, $GeO_2$, $B_2O_3$, the difficulty arises that there will be an undefined precipitation of solids from the absorption liquid and that the gas scrubber(s) will be plugged and thus rendered ineffective by these solids. This difficulty does not only exist with respect to the dust oxides mentioned above, but generally with respect to any finely divided oxides which are predominantly obtained during the hydrolysis of highly volatile halides, e.g., halides of the elements Si, Ge, B, Sn, Ti, V, W, P.

Such finely divided oxides as pollutants in addition to gas pollutants such as chlorine gas are contained particularly in waste gases originating in chemical vapor phase reactions used in known methods for producing preforms for optical waveguides. The invention will be described as applied to the purification of waste gases produced in such chemical vapor phase reactions.

It is the object of the invention to provide a method for purifying waste gases containing dust and gas pollutants which can also be used satisfactorily to purify dusts with an extremely fine distribution. Furthermore, an apparatus for carrying out the method will also be described.

The invention will now be described in more detail with the help of the only accompanying drawing. The drawing shows the schematic construction of the entire apparatus for purifying the waste gases originating during the manufacture of optical waveguide preforms. If chemical vapor phase reactions are used in the manufacture of optical waveguide preforms (a survey of various manufacturing methods can be found in "telcom-Report" Vol. 6 (1983) supplement "Nachrichtenübertragung mit Licht", pp. 29–35), the following pollutants are released by chemical reactions which proceed completely or only partly, and are taken away by the outlet air of the manufacturing machine:

| Pollutants | State |
|---|---|
| chlorine gas | gaseous, moist |
| silicon dioxide | dusty |
| germanium dioxide | dusty |
| phosphorus pentaoxide | dusty |
| boron trioxide | dusty |
| hydrochloric acid | gaseous cloud |
| silicon tetrachloride | vaporous |
| germanium tetrachloride | vaporous |

These pollutants are retained in the method described hereinafter in such a manner that the legal requirements presently in force for clean air and water can be fully satisfied.

In accordance with the invention, a dry fabric filter is used to remove finely distributed dust from the waste gas.

The left-hand part of the drawing shows such a dry fabric filter, which bears the reference numeral 1. The waste gas to be purified flows out of a waste-gas pipe 2 into the filter 1, drawn in by a high-pressure fan 3. The filter 1 comprises an arrangement of parallel filter bags 4 made of a coated fabric whose upper open ends lead to a clean-air chamber 5 of the filter 1. The dust contained in the waste gas collects at the outside of the filter bags, while the dust-free waste gas leaves the filter via the clean-air chamber 5 and an outlet connection 6 of the filter 1. A special feature of the filter is that the filter bags are made of a fabric material, also called a membrane filter, whose outside is coated, preferably with polytetrafluoroethylene (PTFE). Such filter bags are offered by W. L. Gore, 8011 Putzbrunn near Munich, under the trademark GORE TEX.

By cleaning the filter bags periodically by means of compressed air, it is ensured in the usual manner that the dust particles clinging to the filter bags fall off and are collected in a dust chamber 7. The dust particles are unloaded from this dust chamber from time to time and filled into containers suitable for further processing.

In these containers, the dust can be thickened and neutralized by the addition of a suitable liquid to permit the dust-free disposal of the waste material on a dump without causing environmental damage. If the waste material contains a certain concentration of the valuable raw material germanium, it may be worth while to recycle it by appropriate methods.

The use of coated fabric filters in accordance with the invention has the advantage that the dust particles collected at the outside of the filter bags can be readily removed from the fabric surface by the known mechanical methods. It has the further advantage that, in a wide temperature range, the dust extraction is insensitive to the temperature of the waste gas to be purified. The upper temperature limit is 150° C.

It should be emphasized that the extraction of finely distributed dusts from waste gases described above is suitable for any applications whose object it is to extract finely distributed dusts from waste gases, independent of the removal of gas pollutants described hereinafter.

Further details of the dust filters, with the exception of the filter bags used, do not require further explanation because they are known, e.g., from advertising leaflets of MikroPuhl, 5000 Köln 90.

For the further purification of the gas and vapor pollutants, the high-pressure fan 3 blows the dust-free gas emerging from the dry filter 1 into a gas scrubber 8 with a following entrainment separator 30.

The gas scrubber 8 is preferably a cross-flow scrubber or a countercurrent scrubber of a known, commercially available design. An absorption liquid is pumped into the scrubber from an absorption liquid tank 9 by means of a pump 10 and sprayed into the waste gas flow to be purified by spray nozzles 11. For the gas and vapor pollutants mentioned above, an aqueous sodium hydroxide solution, NaOH, having a pH value of at least 10 to 12, is used as the absorption liquid, also termed scrubbing liquid. By the sprayed absorption liquid and by the contact with the surfaces of the packings wetted by the absorption liquid, the waste gases to be purified are intimately mixed with the absorption liquid in the scrubber, so that the following chemical absorption reactions take place:

| | | |
|---|---|---|
| $Cl_2 + 2NaOH$ | $\rightarrow$ | $NaCl + NaOCl$ |
| $HCl + NaOH$ | $\rightarrow$ | $NaCl + H_2O$ |
| $SiCl_4 + 2H_2O$ | $\rightarrow$ | $SiO_2 + 4HCl$ |
| $GeCl_4 + 2H_2O$ | $\rightarrow$ | $GeO_2 + 4HCl$ |

The two latter reactions are less important quantitatively because that part of the $SiCl_4$ which is not used in the chemical vapor phase reaction has already reacted to a large extent with the humidity present in the waste-gas flow on the way to the scrubber, and because $GeCl_4$ as the starting material of the dopant is only present in a low concentration from the outset. Due to their low concentration and the high pH value of the absorption liquid, the oxides $SiO_2$ and $GeO_2$ remain dissolved in the absorption liquid, and no solids are precipitated.

The absorption liquid, which, as a result of the above absorption reactions, is polluted with NaCl (common salt) and NaOCl (sodium hypochlorite or chlorine bleach), leaves the cross-flow scrubber via an outlet at its bottom and flows through a solenoid valve 12, as long as it is open, back into the absorption-liquid tank 9. In this manner, absorption liquid is recirculated continuously in the absorption-liquid circulation system. A further solenoid valve 13 which is located in a pipe leading from the outlet of the scrubber to a second tank 14 is closed as long as the absorption liquid circulates in the absorption-liquid circulation system with the solenoid valve 12 open.

With the help of a high-pressure fan following the entrainment separator 30, the waste gas to be purified in the scrubber flows therethrough and through the following entrainment separator. The entrainment separator liberates the flowing gas from entrained absorption-liquid drops. The liquid thus separated is introduced into the liquid emerging from the scrubber (not shown).

As a result of the absorption of the pollutants in the scrubber, the waste gas blown into the atmosphere by the high-pressure fan 15 is purified so thoroughly that it has a normal content of 0.5 ppm of $Cl_2/m^3$ and a maximum content of 1.5 ppm of $Cl_2/m^3$, which is well below the maximum permissible limit value. If a larger gas scrubber is used, the residual chlorine content can be readily reduced even more (longer retention time).

The high pH value of at least 10 to 12 required in the absorption-liquid circulation system is constantly measured by a pH measuring and control device 16 which, to keep the pH value constant, replaces the used NaOH by the controlled addition from an NaOH tank 18 to the absorption-liquid tank via a controlled pump 17.

As in any gas scrubbing method, the one described above also involves the difficulty that the polluted absorption solution has to be detoxicated. In contrast to the method according to the state of the art described above which provides that the polluted absorption liquid must be picked up and disposed of in separate methods, and in which the gas scrubbing must be interruped from time to time in order to withdraw the polluted absorption solution, the withdrawal of the polluted absorption liquid, its detoxication and the refilling of unpolluted absorption liquid is effected as follows in accordance with the invention:

A measuring and control device 19 continuously measures the pollutant concentration of the absorption liquid circulating in the absorption-liquid circulation system and, when a predeterminable maximum permissible pollutant concentration is reached, controls the solenoid valves 12 and 13 in such a manner that the solenoid valve 12 in the absorption-liquid circulation system is closed and the solenoid valve 13 is opened simultaneously. Thus, the absorption liquid leaving the scrubber is now introduced into the tank 14 rather than into the absorption-liquid tank 9. Furthermore, the pump 10 pumps the absorption liquid out of the absorption-liquid tank 9 and into the scrubber and from there into the tank 14 until the volume of the absorption liquid in the absorption-liquid tank 9 is reduced by half and a float in the tank 9 closes the solenoid valve 13 and simultaneously reopens the solenoid valve 12.

Thus, part of the polluted absorption liquid has been withdrawn from the absorption-liquid circulation system and introduced into the tank 14 in which the polluted absorption liquid is then detoxicated. During the withdrawal of part of the polluted absorption liquid from the absorption-liquid circulation system, water from a water tank (not shown) is introduced into the reduced volume of the absorption liquid in the absorption-liquid tank 9, thus reducing the concentration of NaCl and NaOCl of the absorption liquid used for the further operation of the gas scrubber. At the same time, the measured addition of NaOH to the absorption-liquid tank 9, depending on the pH value, as described above, is carried out continuously.

The pollutant concentration of the absorption liquid can be measured in various ways:

One is to measure the conductivity of the absorption liquid, which is directly proportional to the salt concentration, by a noncontact measurement technique, namely by applying an electric alternating field and measuring its attenuation. Another one is to measure the salt concentration in the absorption liquid by means of electrodes which are sensitive to ions.

An important aspect of the invention is that, by presetting the pollution concentration limit of the absorbent, the salt concentration of the part withdrawn from the absorption liquid, and thus the salt concentration of the detoxicated absorption liquid introduced into the sewage system is predetermined. If a given volume per unit of time were withdrawn continuously, the liquid to be detoxicated would have an indeterminate salt concentration.

After part of the absorption liquid has been withdrawn from the absorption-liquid circulation system, as described above, and introduced into the tank 14, and the absorption-liquid circulation system through the absorption-liquid tank 9 has been restarted, there will be enough time for the detoxication of the polluted absorption liquid contained in the tank 14, termed detoxication tank, until the next withdrawal of absorption liquid controlled by the measuring and control device 19 is effected.

This detoxication is effected as follows: A recirculation pump 20 continuously withdraws liquid near the bottom of the detoxication tank 14 and pumps it back into the tank at the top. A measuring and control device 21 continuously measures the redox potential of the liquid flowing in a "detoxication circulation system" via the pump 20 and controls the addition of sodium bisulfite, NaHSO₃ (as a reductant) to the detoxication tank 14 until the known reduction process

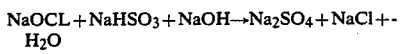

is completed, i.e., until the redox potential indicates that no free Cl⁻ ions are present in the liquid to be detoxicated.

A second measuring and control device 22, which measures the pH value of the liquid circulating in the detoxication circulation system, then controls the addition of NaOH in such a manner that the hydrochloric and sulphuric acids originating during the reduction process are neutralized immediately, i.e., the device controls the addition of NaOH in such a manner that the pH value of the liquid does not drop below 7. After the completion of the reduction process, the addition of sodium hydroxide solution or HCl is controlled in such a manner that the liquid is neutralized, i.e., that a pH value of 6.5 to 7.5 is set, which corresponds to that of the prescribed pH value of the waste water. If this prescribed pH value has been measured for a sufficient period of time, a solenoid valve 23 is opened through which the contents of the detoxication tank, a reduced and neutralized liquid, is introduced into the sewage system. This liquid contains the non-toxic salts NaCl (common salt) and Na₂SO₄ (Glauber salt) in a concentration which is far below the maximum permissible limit.

In the drawing, the storage tanks for hydrochloric acid, sodium hydroxide solution, and sodium bisulphite and the corresponding controllable metering pumps have the reference numerals 24 to 26 and 27 to 29, respectively.

An essential advantage of the described method and the suitable apparatus consists in the fact that the salt concentration of the absorption liquid introduced into the gas scrubber is limited, so that a salt precipitation in the gas scrubber, which would impair its effectiveness, is excluded. The entire apparatus is fully automated and requires little maintenance and relatively small quantities of detoxication chemicals.

We claim:

1. Method for purifying waste gases containing pollutants in dust, gas, and/or vapor form wherein in a first step, dust is extracted, and wherein in one or more further steps, the gaseous pollutants are absorbed from the dust-free waste gas by means of an absorption liquid flowing in an absorption-liquid circulation system,
    characterized in that a dry, coated fabric filter is used for the dust extraction, that the pollutant concentration of the absorption liquid is measured continuously, that, when a predeterminable maximum permissible pollutant concentration is reached, part of the absorption liquid is withdrawn from the absorption-liquid circulation system and is subjected to a chemical detoxication treatment in a separate detoxication circulation system and is then introduced into a sewage system, and that in the absorption-liquid circulation system, the withdrawn part of the absorption liquid is replaced by fresh, unpolluted absorption liquid.

2. A method as claimed in claim 1, characterized by the use of polytetrafluoroethylene-coated fabric filters for dust extraction.

3. A method as claimed in claim 1, wherein the pollutant concentration of the absorption-liquid is determined by contactless measurement of the conductivity of the absorption-liquid using an a.c. induction technique.

4. A method as claimed in claim 1, wherein the pollutant concentration of the absorption-liquid is determined by measuring the salt concentration of the absorption-liquid by means of electrodes which are sensitive to ions.

5. A method as claimed in claim 1, wherein during the chemical detoxication treatment, polluted absorption-liquid is completely reduced by redox-potential-dependent addition of a reductant and by simultaneous pH-value-dependent addition of sodium hydroxide solution, and that after the completion of this reduction process, the prescribed waste-water pH-value is set by adding a strong acid.

6. A method as claimed in claim 1, wherein the salt concentration in the withdrawn part of the absorption-liquid and in the waste-water is predetermined by the predetermination of the pollutant concentration limit of the absorption-liquid.

7. A method as claimed in claim 1, including the additional step of thickening the extracted dust by adding a liquid.

8. An apparatus for purifying waste gases containing pollutants in dust, gas, and/or vapor form, comprising:
    a dust collector including a dust filter having polytetrafluoroethylene-coated fabric filters and means for conveying said waste gases through said filter;
    a gas scrubber connected to said dust collector for receiving said waste gases and subjecting said waste gases to an absorption-liquid;
    an absorption-liquid circulation system for storing said absorption-liquid and circulating said liquid through said gas scrubber;
    a detoxication tank for receiving used absorption-liquid;
    means for automatically withdrawing absorption-liquid from the absorption-liquid circulation system as a function of the pollution concentration of the absorption-liquid, for introducing said withdrawn absorption-liquid into the detoxication tank and for automatically refilling the absorpotion-liquid circulation system with fresh absorption-liquid; and
    means for maintaining circulation of the withdrawn absorption-liquid through the detoxication tank and for automatically introducing a reductant, a sodium hydroxide solution, and a strong acid into the detoxication tank in amounts determined by the redox-potential of the withdrawn absorption-liquid and the pH level of said liquid.

9. An apparatus as described in claim 8 additionally comprising:
    measuring and control means for continuously measuring the pollutant concentration of the absorption-liquid flowing in the absorption-liquid circulation system and for controlling withdrawal of part of the absorption-liquid from the absorption-liquid circulation system when a predetermined maximum permissible pollutant concentration is reached and for introducing the withdrawn part of the absorption-liquid into the detoxication tank;
    means for continuously measuring the redox-potential of the absorption-liquid flowing into the detoxication tank for controlling the addition of reductant to the withdrawn absorption-liquid until a redox-potential indicates that the reduction is complete; and means for continuously measuring the pH-value of the withdrawn absorption-liquid and for controlling the addition of sodium hydroxide solution during the reduction process and thereafter controlling the addition of sodium hydroxide solution and a strong acid so that the absorption-liquid is neutralized.

* * * * *